United States Patent [19]

Stanczak et al.

[11] 4,372,603
[45] Feb. 8, 1983

[54] DOUBLE PIVOT DOOR FOR CARGO VEHICLES

[75] Inventors: Edmund A. Stanczak; Stephen J. Ringe, both of Detroit, Mich.

[73] Assignee: Fruehauf Corporation, Detroit, Mich.

[21] Appl. No.: 198,991

[22] Filed: Oct. 21, 1980

Related U.S. Application Data

[63] Continuation of Ser. No. 970,315, Dec. 18, 1978, abandoned.

[51] Int. Cl.³ .............................................. B60J 1/00
[52] U.S. Cl. .................................... 296/146; 49/246; 292/DIG. 17
[58] Field of Search ...................... 296/146, 181, 183; 49/383, 246, 208; 292/DIG. 17

[56] References Cited

U.S. PATENT DOCUMENTS 1,988,585  1/1935  Dath ...................................... 49/246
2,000,474  5/1935  O'Connor ............................ 49/246
2,072,641  3/1937  Madland .............................. 49/246

Primary Examiner—Joseph F. Peters, Jr.
Assistant Examiner—John A. Carroll
Attorney, Agent, or Firm—Ralph J. Skinkiss; Ronald Wangerow; John P. Snyder

[57] ABSTRACT

A double pivot or toggle action hinge action and a latching or keeping function are combined in a single entity for the purpose of hinging a door as well as serving as the mechanism to lock the door in a closed position. The combined assembly includes a shaft defining a first pivot axis and interdigitated hinge members on the shaft and on the associated door which are pivotally joined about a second axis parallel to the first axis and a handle is connected to the shaft to control the toggling action of the hinge and, finally, the door is provided with a latch or keeper which is adapted to capture and retain the handle whereby positively to hold the assembly in door-closed position.

19 Claims, 8 Drawing Figures

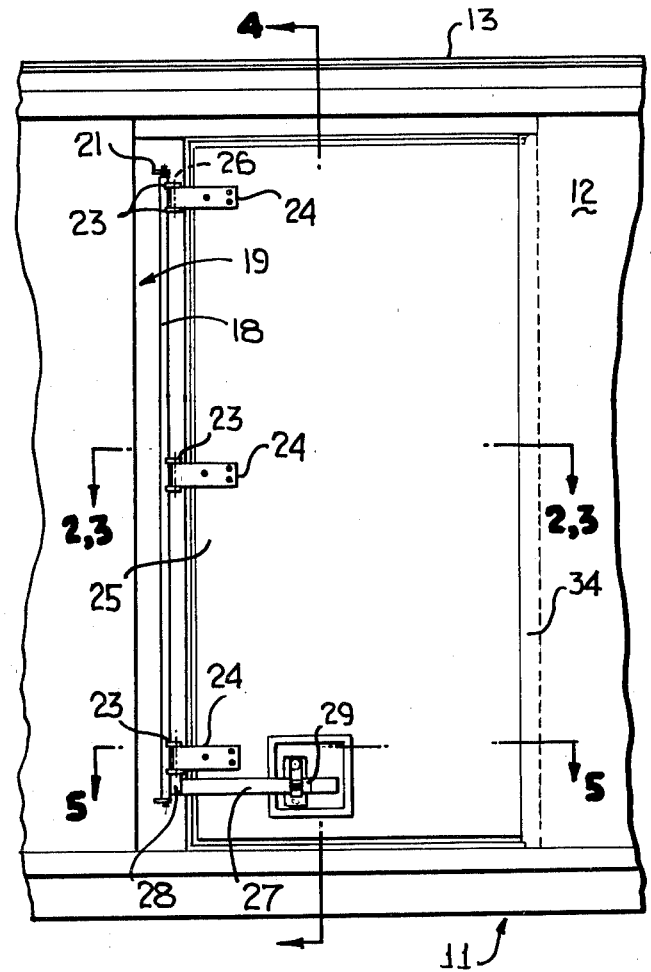
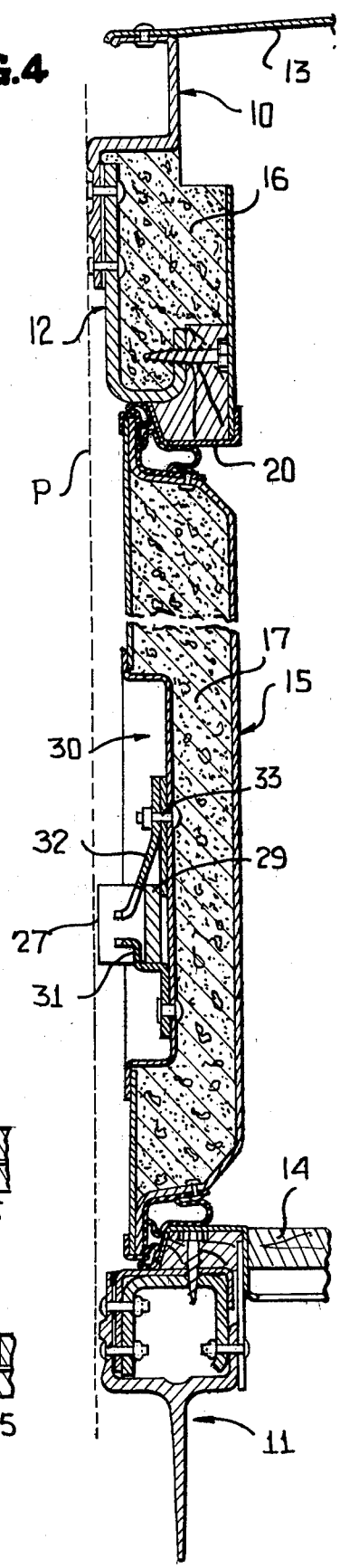
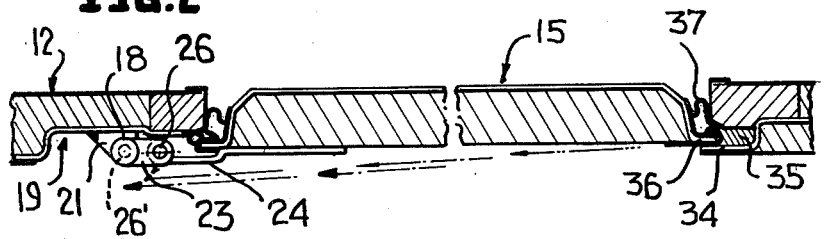
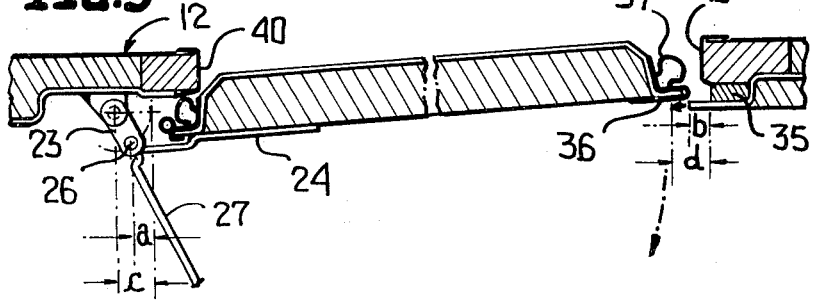

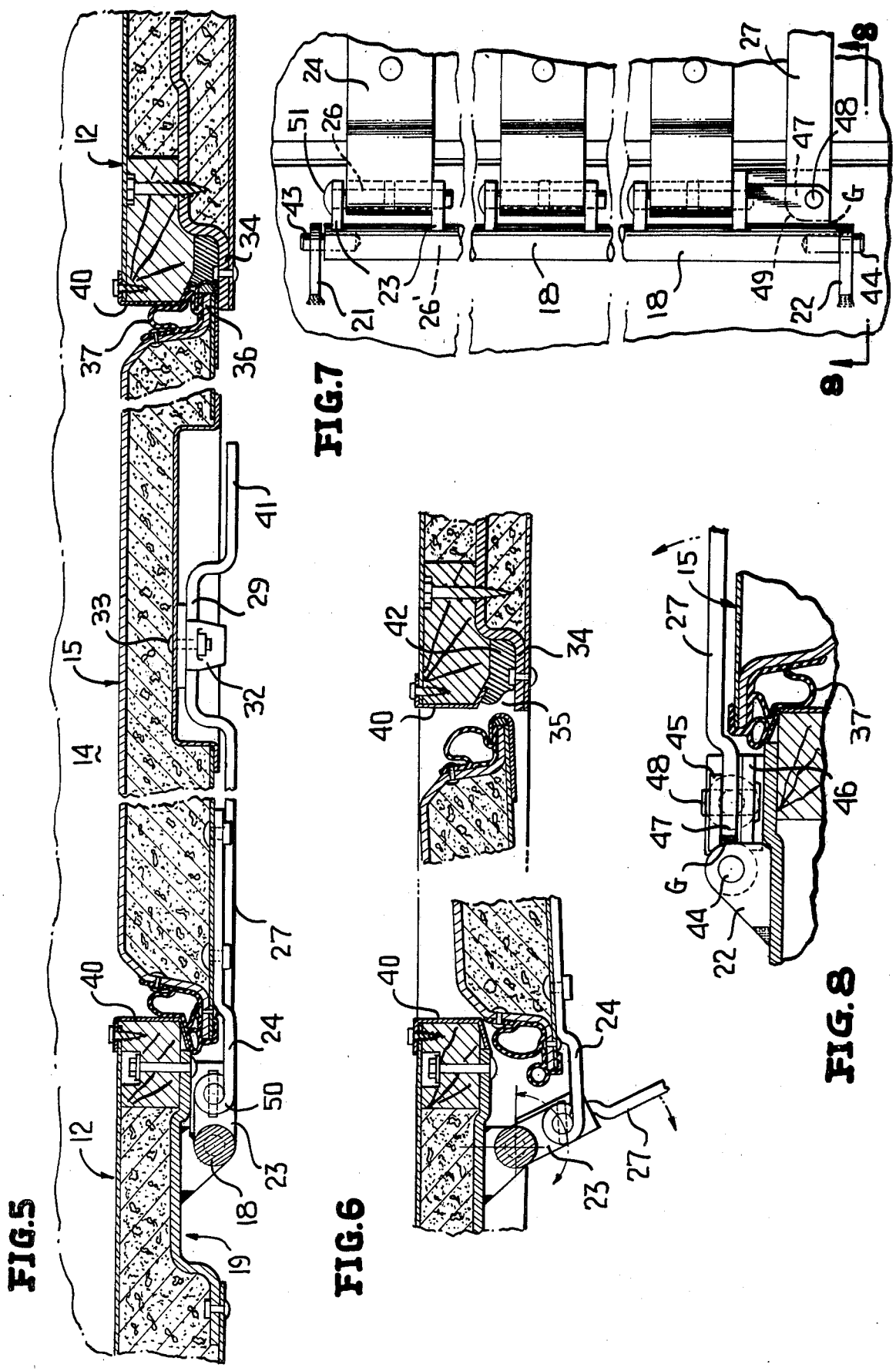

DOUBLE PIVOT DOOR FOR CARGO VEHICLES

This is a continuation, of application Ser. No. 970,315, filed Dec. 18, 1978 now abandoned.

BACKGROUND OF THE INVENTION

The invention pertains to cargo transportion vehicles or equipment such as conventional vans and insulated type vans for heavy trucks, semi-trailers and the like and in particular to the hardware used with the side doors of such equipment. In order to maximize their operational efficiency, the inside width of such vans is made as large as feasible and inasmuch as the overall outside width of the vehicle is limited by regulations, the thicknesses of the side walls consequently is of importance. Thus, where a door is installed into a side wall, the thickness of the door itself as well as the spatial requirements of the hardware for hinging and locking the door requires special design considerations in order to avoid the otherwise unnecessary thickening of the side wall or encroachment, in widthwise direction, on the overall outside width.

The thickness of a side door of a van of the type used for the transportation of general cargo is determined primarily by the operational forces exerted against the door itself. The thickness must be adequate to contain the cargo safely, barring a catastrophic road accident. In the case of insulated vans, the thickness of its several walls are determined primarily by the degree of insulation required for the intended service. The presence of a side door requires that its installation does not appreciably reduce the thermal efficiency of the side wall including its door, in the case of an insulated vehicle and in any event, the hardware must not require so much space for mounting an installation as will cause it to protrude excessively or as will require modification of the van structure either to encroach upon the otherwise useful cargo space or detrimentally affect either the structural or insulating integrity of the vehicle.

The hinging of a side door requires the hardware not only to have a minimal spatial requirement but also from a practical operational viewpoint to permit the door to be swung open approximately 180° to lie as flat as possible against the adjacent side wall.

The requirement that a side door be hinged to allow approximate 180° swing is commonly achieved by locating the vertical hinge line of a conventional single pivot hinge to be as close as possible to the outside surface of the van body. Additionally, the strap portion of the hinge which is secured to the door is angled inboard from the hinge line and secured to the outside surface of the door which is set well inboard of the van body surface, thereby decreasing the thickness of the door.

The locking hardware, as commonly used, comprises a vertical lock rod located on the outer surface of the door adjacent its free swinging edge and journalled to rotate about its vertical axis. Upon rotation of the locking rod, locking fingers attached at the ends thereto engage with frame-mounted keepers, and further rotation of the rod causes the door to be forced into its closed position. Such hardware, as in the case of the hinging hardware, is designed and installed so as not to protrude beyond the outside surface of the van body. This requires that the outside surface of the door, or as a minimum that portion of the door on which the hardware is installed, to be inset from the van body surface.

Therefore, with such prior art hinging and locking hardware, the overall door thickness is undesirably yet necessarily reduced or, alternatively, if a given door thickness is required, the door in its entirety must be set further inboard and this, of course, then reduces the cargo cubage of the van.

Although double pivot hinges have been contemplated in the prior art, as is evidenced by U.S. Pat. Nos. 1,988,585 and 2,071,236, separate hinging and latching or keeper mechanism is provided therein.

BRIEF SUMMARY OF THE INVENTION

Accordingly, it is of primary concern in connection with this invention to provide an improved van door mounting hardware which combines the functions of a double pivot hinge and latching or keeping. Thus, the invention comprehends the usage of a double pivot hinge with an integrated locking or latching mechanism. This combined assembly is mounted adjacent the door opening in a vertical side wall and connects a vertical edge of the door thereto, serving to slide the opposite vertical edge of the door under a flange or keeper at the opposite side of the door opening frame, thereby to capture and hold such opposite free edge of the door in its fully closed position.

A primary object of the invention is to provide a side door, the surfaces of which are generally flush with the side walls of a van or the like and to provide means for hinging and locking such side door with hardware that does not protrude outwardly beyond the side wall surface while, at the same time, allowing the door to be swung to a fully open position which is displaced from the closed position by substantially 180°.

Another object of the invention is to provide a combined assembly as noted above that requires a minimum of spatial requirements for installation in order that the side wall thickness and commensurate door thickness are not adversely affected. Further, it is an object of the invention to provide a side door hinging system which, as the door is swung open, prevents it from tilting or canting out of a vertical plane and to provide a side door locking and securing system, the conceptual design of which has a high degree of safety. Still further, it is an object of this invention to provide a side door locking system which when the door is closed and locked, effectively resists outward forces imposed on the door by the cargo without imposing undue stress on the hinge assembly.

BRIEF DESCRIPTION OF THE DRAWING FIGURES

FIG. 1 is a side elevational view showing a portion of a cargo vehicle having a door and hardware constructed in accord with this invention;

FIG. 2 is a horizontal section taken substantially along the plane of section 2—2 in FIG. 1;

FIG. 3 is a view similar to FIG. 2 but showing the door at the beginning of opening or in the terminal closing position;

FIG. 4 is an enlarged vertical section taken substantially along the plane of section line 4—4 in FIG. 1;

FIG. 5 is an enlarged horizontal section taken substantially along the plane of section 5—5 in FIG. 1;

FIG. 6 is an enlarged section corresponding generally to FIG. 3;

FIG. 7 is an enlarged side elevational view of the combined hinge/keeper assembly; and FIG. 8 is a horizontal section taken substantially along the plane of section 8—8 in FIG. 7.

DETAILED DESCRIPTION OF THE INVENTION

Referring at this time more particularly to FIG. 4, a typical vehicle construction is indicated therein, and which will be seen to include the upper side rail 10, the lower side rail 11 and the side wall indicated generally by the reference character 12. The upper side rail 10 supports a roof sheet 13 whereas the lower side rails 11 support a floor 14, all of which is conventional. As is also conventional, the vehicle is so constructed that at each side thereof, there is an imaginary plane as indicated by the dashed line P which constitutes the outermost dimension of the vehicle at each side thereof and, in accord with current regulations, the maximum width dimension which may be made between such imaginary planes is strictly limited. Thus, the thicknesses of the side walls and any doors associated therewith are critical in achieving the maximum of cargo space within the vehicle width dimension. As can be seen from FIG. 4, the door 15 and the combined hinge/keeper mounting assembly therefor according to this invention do not encroach upon or penetrate this imaginary plane P while, at the same time, allowing normal thicknesses of the side wall 12 and of the door 15 to suit the purposes intended.

In the specific construction shown in FIG. 4, a refrigerated type of van is illustrated and, for this purpose, not only are the side walls provided with conventional foamed material as indicated by reference character 16, but the door is also constructed to be filled with such foamed, insulating material 17, as is conventional in the art.

Referring at this time more particularly to FIG. 1, the hardware of this invention will be seen to consist of a shaft or rod 18 disposed vertically and located within a recess 19 in a marginal edge of the side wall 12 adjacent the door opening or frame 20 (see FIG. 4) and pivotally mounted about its longitudinal axis by the hinge pin elements 21 and 22. Fixed to the shaft or rod 18 are first hinge members 23 which are interdigitated with second hinge members 24 fixed to the adjacent side edge 25 of the door 15. Suitable pivot means are provided to interconnect the members 23 and 24 to define a second pivot axis 26 which is parallel to but offset from the first pivot axis defined by the longitudinal axis of the shaft 18.

Also secured to the shaft 18 is a handle 27 which is pivoted thereto about its axis 28 perpendicular to a plane containing the aforementioned dual pivot axis.

This handle 27 is provided with an inwardly offset portion 29 which projects into a recess 30 in the door 15, see particularly FIG. 4, and is adapted to be swung behind a keeper element 31 fixed to the door within the recess 30, as is shown clearly in FIG. 4. A swingable locking plate or finger 32 is pivotally mounted at 33 within the recess 30 and may be swung aside to allow the handle to be upwardly swung out of its captured relation by the element 31 whereafter the door opening operation may be commenced as is illustrated in FIGS. 2 and 3. FIGS. 2 and 3 also clearly show the means whereby the free edge of the door is captured and held in closed position by means of the keeper plate 34 which defines a keeper channel 35 which captures and retains the marginal edge flange 36 of the door. Thus, the compressible seal 37 which surrounds the door is maintained in properly compressed and sealing condition when the door is fully closed.

FIG. 2 taken in conjunction with FIG. 3 clearly shows the effect of the dual hinge axes 26 and 26'. When the door is in closed position as in FIG. 2, the hardware is nested within the recess 19 and so does not encroach into the space outside of the imaginary plane P in FIG. 4. However, the hinge members 23 are of sufficient length such that when the door is swung toward the open position by means of a handle 27, the pivot axis 26 is swung outwardly beyond the outer surfaces of the side wall 12, thereby allowing the door ultimately to be swung substantially 180° so that it may lie flat or substantially flat against the side wall surface.

FIG. 3 also illustrates the compound motion of the door during initial opening or terminal closing motions thereof as effected by the combined hinge/keeper assembly of this invention. As illustrated, the free edge of the door as the handle 27 initially is swung away from the door is translated to withdraw it from the recess or channel 35 while, at the same time, the hinge side of the door is both translated and swung outwardly as shown. This particular motion is extremely effective in assuring a "breaking" of the seal achieved between the compressible sealing element 37 and the surrounding surfaces 40 of the door opening-defining frame in the side wall, particularly when the interior of the cargo space is subjected to refrigeration such as tends to cause formation of frost or ice in the region of the seal.

As will be seen from the enlarged details illustrated in FIGS. 1-8 inclusive, the handle 27 may be grasped by the free end portion 41 and swung upwardly to release it from the keeper 31 (FIG. 4), the member 32 having been swung aside for this purpose and the handle then swung outwardly which, because of its attachment to the shaft 18 will break the toggle action of the hinge assembly as is shown in FIG. 6. These Figures also show that the channel 35 may be partially filled with resilient material 42 to provide a more effective seal at the free edge of the door and to preload the door and hinge assembly somewhat to prevent looseness when the door is closed. As is shown in FIGS. 7 and 8, the members 21 and 22 carry respective pintle pins 43 and 44 received in counterbores at the opposite ends of the shaft 18 to pivot the latter about its longitudinal axis as described hereinbefore. The manner in which the handle 27 is attached to the shaft 18 will be evident from FIG. 8 wherein it will be seen that the two ears 45 and 46 are rigidly secured as by welding directly to the shaft 18 and to project laterally therefrom to define a space receiving the inner end 47 of the handle 27. A pivot pin 48 passes through all three members and allows the handle 27 to be pivoted about an axis which is perpendicular to a plane containing the axes 26 and 26' as previously described while, at the same time, allowing the handle to exert a torsional opening force directly at the lower end of the shaft 18. A gap G (FIGS. 7 and 8) adjacent the end 47 of the handle 27 allows the handle 27 to swing upwardly to clear the member 31 as previously described, while a rounded corner 49 of the end 47 of the handle 27 allows the handle 47 to rotate 90° downwardly so as to be parallel to the shaft 18. This construction permits the handle 27 to be clear of interfering with anything when the door is swung 180° against the sidewall.

The hinge members 23 are preferably provided in pairs as illustrated in FIG. 7 each to straddle the curled free end 50 of an associated hing plate or member 24 secured to the door and in each case a pintle pin 51 is passed through the members 23 and the curled end 50 to establish the pivot axis 26.

What is claimed is:

1. In a cargo vehicle having vertical walls surrounding a cargo space, at least one of said walls having an opening to provide access to said cargo space, and a door cooperating with such opening for movement between open and closed positions relative thereto, the improvement which comprises combined hinging and locking means for securing said door in closed positions while allowing the door to be swung substantially 180° to open position, without requiring encroachment upon said cargo space or significant reduction in door or wall thickness;

said means comprising a double pivot hinge assembly connecting one vertical side edge of said door to said one wall of one side of said opening, retainer means for capturing and holding the opposite side edge of the door when in closed position, handle means connected to said hinge assembly for swinging said one side edge away from said one wall while withdrawing the opposite side edge from said retainer means, and latch means for locking said handle means to said said door when the latter is in closed position, said one wall being recessed along that side of the opening on which said hinge assembly is mounted; said hinge assembly being nested within said recess when the door is in closed position.

2. In a cargo vehicle as defined in claim 1 wherein said hinge assembly comprises a vertical shaft and pivot means connecting said shaft to said one wall within said recess for pivotal motion about a first axis which is coincidental with the longitudinal axis of said shaft, first hinge elements fixed to said shaft and projecting therefrom substantially parallel to said one wall toward said door when the latter is in closed position, second hinge elements projecting laterally from said one side edge of the door, and pivot means connecting said first and second hinge elements for defining a second axis parallel to but spaced from said first axis.

3. In a cargo vehicle as defined in claim 2 wherein said handle is connected to said shaft.

4. In a cargo vehicle as defined in claim 3 wherein said handle is connected to said shaft about a pivot axis perpendicular to a plane containing said first and second axes.

5. In a cargo vehicle as defined in claim 4 wherein said latch means comprises a keeper on said door adapted to capture said handle behind it.

6. In a cargo vehicle as defined in claim 2 wherein said second axis is spaced from said first axis by an amount sufficient to allow positioning of said second axis outwardly of said recess.

7. In a cargo vehicle as defined in claim 6 wherein said handle is connected to said shaft.

8. In a cargo vehicle as defined in claim 7 wherein said handle is connected to said shaft about a pivot axis perpendicular to a plane containing said first and second axes.

9. In a cargo vehicle as defined in claim 8 wherein said latch means comprises a keeper on said door adapted to capture said handle behind it.

10. In a cargo vehicle having a body including vertical side walls providing a cargo space therebetween, said body having a predetermined external width dimension and said side walls having predetermined thicknesses within said width dimension, sufficient to maintain the structural integrity of said walls without unnecessary encroachment upon said cargo space, at least one of said walls having an opening therein, a door sized to fill said opening, and hinge means mounting one edge of said door to said one wall along a marginal edge of the latter at one side of the opening for allowing the door to move between a closed position and a fully opened position in which the door in swung substantially 180° from such closed position substantially into face-to-face relation to said one wall; said marginal edge of said one wall being of a thickness less than said predetermined thickness thereof to provide a vertically extending external recess along said one side of the opening, said hinge means being nested within said recess when the door is in closed position whereby to reside within said predetermined width dimension of the vehicle body; said hinge means comprising a vertical shaft pivotally mounted on said one wall for rotation about the longitudinal axis of the shaft, first hinge members fixed to and projecting laterally from said shaft, second hinge members fixed to and projecting laterally from said one edge of the door, and pivot means joining said first and second hinge members about a second pivot axis parallel to but offset from said longitudinal axis of the shaft, said first hinge members being of lengths sufficient to shift said second pivot axis outwardly from said one wall during opening of said door whereby to allow the substantially 180° movement thereof from the closed position; keeper means on said one wall for capturing and retaining said door, at that edge thereof opposite said one edge, when the door is in closed position; and handle/latch means connected to said shaft for retaining said door engaged with said keeper means and said hinge means in toggled, door-closing condition.

11. In a cargo vehicle as defined in claim 10 wherein said handle/latch means is in the form of a handle pivotally attached to said shaft about an axis perpendicular to a plane containing said first and second axes and means on said door for capturing and retaining a portion of said handle remote from said shaft.

12. In a refrigerated vehicle having an upstanding wall provided with a door opening, a door received in said opening in substantially flush relation with the outer surface of said wall, a compressible seal circumscribing said door and compressed between the door and that marginal edge of the wall defining said opening and hinge means mounting said door for closing and opening movements relative to said opening, the improvement wherein:

said door is provided with a lateral extension at one vertical side thereof and said wall is provided with a keeper channel receiving said extension when the door is in closed position; and said hinge means comprises a first hinge member pivotally mounted on the outer side of said wall about a first vertical axis closely spaced from that other vertical side of the door opposite said one vertical side thereof, a second hinge member fixed to said door and projecting laterally from said other vertical side of the door, pivot means fixed to said first hinge member and pivotally connected to said second hinge member about a second vertical axis spaced from said first axis, and a handle connected to said first hinge member and forming an extension thereof for swinging said other side of the door outwardly from the opening while simultaneously translating said one side of the door to withdraw said extension from said keeper channel.

13. In a refrigerated vehicle as defined in claim 12 wherein said first hinge member is in the form of a rod having its axis coincidental with said first axis.

14. In a refrigerated vehicle having a vertical wall provided with an opening, a door received in said opening in substantially flush relation with the outer surface of said wall, a compressible seal circumscribing said door and compressed between it and the margin of the wall defining said opening, said hinge means for allowing said door to be swung to open position, the improvement wherein:

said hinge means comprises a vertical rod and means on said wall pivotally mounting said rod about its longitudinal axis, a series of first hinge members fixed to said rod and spaced longitudinally along its length, a plurality of second hinge member fixed to said door and projecting laterally from one vertical side edge thereof, pivot means pivotally connecting said first hinge members to said second hinge members about a second axis parallel to but spaced from said longitudinal axis of the rod, said longitudinal axis of the rod and said second axis lying in a plane substantially parallel to the door when the latter is in its closed position, and a handle connected to and projecting laterally from said rod for imparting torsion thereto to move the door to open position; and keeper means for retaining the other vertical side edge of the door when the latter is in closed position.

15. In a van body having a side wall of predetermined thickness, said side wall having an outer surface and having a door opening therein, the combination of a door sized to fill the door opening and being of a thickness commensurate with that of said side wall, sealing means interposed between the periphery of said door and the margin of said side wall defining said door opening, and hinge/keeper means mounted substantially flush with respect to said side wall and said door for controlling initial opening and terminal closing motions of said door to preserve the integrity of said sealing means while permitting the door to swing substantially 180° between its fully open and fully closed positions, said door and said hinge/keeper means being mounted in recessed relationship with respect to said outer surface of said side wall when the door is in its closed position.

16. In a van body as defined in claim 15 wherein said hinge/keeper means includes a toggle action hinge.

17. In a van body as defined in claim 16 wherein said hinge/keeper means also includes a handle directly connected to one element of the hinge to control the toggle action thereof and a keeper on said door for latching said handle thereto.

18. In a container having vertical walls surrounding a cargo space at least one of said walls having an opening to provide access to said cargo space, and a door cooperating with such opening for movement between open and closed positions relative thereto, the improvement which comprises combined hinging and locking means for securing said door in closed positions while allowing the door to be swung substantially 180° said open position, without requiring encroachment upon said cargo space or significant reduction in door or wall thickness;

said means comprising a double pivot hinge assembly connecting one vertical side edge of said door to said one wall of one side of said opening, retainer means for capturing and holding the opposite side edge of the door when in closed position, handle means connected to said hinge assembly for swinging said one side edge away from said one wall while withdrawing the opposite side edge from said retainer means, and latch means for locking said handle means to said door when the latter is in closed position, said one wall being recessed along that side of the opening on which said hinge assembly is mounted, said hinge assembly being nested within said recess when the door is in closed position.

19. A door assembly comprising a wall having an opening therein, a hinge member secured to the wall pivotally about a first axis parallel and adjacent to a first edge of the opening, a door for closing the opening secured at an edge portion to the hinge member pivotally about a second axis parallel to and spaced apart from the first axis, the arrangement being such that when the door is in its closed position the second axis is nearer to the free edge of the door than the first axis is, retaining means that prevents the free edge of the door from moving outwards away from the plane of the wall when the door is in its closed position, and means for rotating the hinge member so that, from the closed position of the door, the hinge side of the door is caused to move outward and the free edge of the door is caused to move substantially in the plane of the opening towards the hinge edge of the opening, the arrangement being such that the free edge of the door is thereby released from the retaining means and that the whole door is then free to swing outwards about at least one of the said axes.

* * * * *